(12) United States Patent
Hurkes et al.

(10) Patent No.: US 11,253,912 B2
(45) Date of Patent: Feb. 22, 2022

(54) METHOD FOR PRODUCING THREE-DIMENSIONALLY LAYERED SHAPED BODIES

(71) Applicant: ASK Chemicals GmbH, Hilden (DE)

(72) Inventors: Natascha Hurkes, Mönchengladbach (DE); Dennis Bartels, Dorsten (DE); Jens Müller, Haan (DE)

(73) Assignee: ASK CHEMICALS GMBH, Hilden (DE)

(*) Notice: Subject to any disclaimer, the term of this patent is extended or adjusted under 35 U.S.C. 154(b) by 243 days.

(21) Appl. No.: 16/618,978

(22) PCT Filed: Jun. 5, 2018

(86) PCT No.: PCT/DE2018/100535
§ 371 (c)(1),
(2) Date: Dec. 3, 2019

(87) PCT Pub. No.: WO2018/224093
PCT Pub. Date: Dec. 13, 2018

(65) Prior Publication Data
US 2020/0139427 A1  May 7, 2020

(30) Foreign Application Priority Data
Jun. 8, 2017 (DE) .................. 10 2017 112 681.3

(51) Int. Cl.
| | |
|---|---|
| *B33Y 10/00* | (2015.01) |
| *B22C 1/22* | (2006.01) |
| *B29C 64/165* | (2017.01) |
| *B22C 9/02* | (2006.01) |
| *B22C 9/10* | (2006.01) |
| *B33Y 80/00* | (2015.01) |
| *B33Y 70/10* | (2020.01) |

(52) U.S. Cl.
CPC ............. *B22C 1/2246* (2013.01); *B22C 1/224* (2013.01); *B22C 9/02* (2013.01); *B22C 9/10* (2013.01); *B29C 64/165* (2017.08); *B33Y 10/00* (2014.12); *B33Y 70/10* (2020.01); *B33Y 80/00* (2014.12)

(58) Field of Classification Search
CPC ....... B22C 1/224; B22C 1/2246; B33Y 10/00; B29C 64/165
See application file for complete search history.

(56) References Cited

U.S. PATENT DOCUMENTS

| | | | |
|---|---|---|---|
| 6,423,255 B1 | 7/2002 | Hoechsmann et al. | |
| 7,531,117 B2 | 5/2009 | Ederer et al. | |
| 7,807,077 B2 | 10/2010 | Hochsmann et al. | |
| 7,955,537 B2 | 6/2011 | Ederer et al. | |
| 8,506,870 B2 | 8/2013 | Hochsmann et al. | |
| 10,144,053 B2 | 12/2018 | Bartels et al. | |
| 10,174,183 B2* | 1/2019 | Nagai | C09D 161/06 |
| 2014/0048740 A1 | 2/2014 | Fourberg et al. | |
| 2017/0037222 A1 | 2/2017 | Nagai et al. | |

FOREIGN PATENT DOCUMENTS

| | | |
|---|---|---|
| DE | 102014002679 A1 | 9/2015 |
| EP | 1137500 A1 | 10/2001 |
| WO | 0168336 A2 | 9/2001 |

\* cited by examiner

Primary Examiner — Kevin E Yoon
(74) Attorney, Agent, or Firm — Standley Law Group LLP

(57) ABSTRACT

The invention relates to a method for producing three-dimensionally layered shaped bodies by means of layer-by-layer construction using a resin component which contains at least one furane resin, and more than 5% by weight and less than 50% by weight monomer furfuryl alcohol, and an acid. The shaped bodies produced in this manner are suitable inter alia as casting molds and casting cores for metal casting.

27 Claims, No Drawings

METHOD FOR PRODUCING THREE-DIMENSIONALLY LAYERED SHAPED BODIES

The invention relates to a method for producing three-dimensionally layered shaped bodies by means of layer-by-layer construction using a resin component which contains at least one furane resin, and more than 5% by weight and less than 50% by weight monomer furfuryl alcohol, and an acid. The shaped bodies produced in this manner are suitable inter alia as casting molds and casting cores for metal casting.

Various methods are known for the layer-by-layer construction of three-dimensionally shaped bodies. With the assistance of these methods, bodies with even the most complicated geometries can be produced directly layer-by-layer by 3D printing from the CAD data without molding tools. This is not possible with conventional methods requiring molds.

WO 2001/068336 A2 discloses various binders for layer-by-layer construction. Inter alia, the use of a furane resin (not described further) with at least 50% furfuryl alcohol and at most 4% ethylene glycol is also cited as binder components. The resin component of the binder is sprayed layer-by-layer over the entire working surface of the loose basic mold material and then is also cured layer-by-layer, but with the selective application of a hardener such as an organic acid.

EP 1268165 B1 varies this method in that both the liquid binder, inter alia also a furane resin that is not described further as well as a liquid hardener are applied selectively and layer-by-layer sequentially in the sequence of resin component and then hardener to the sections to be cured.

According to EP 1509382 B1, the resin component of the binder is not applied layer-by-layer by means of a printhead, but rather is mixed directly with the basic mold material and applied layer-by-layer together with the basic mold material. This mixture consisting of the resin component and basic mold material is then cured by the selective application of the hardener.

In EP 1638758 B1, the sequence of addition is reversed. First, the basic mold material is premixed with a hardener, and then the resin component is selectively applied layer-by-layer. Inter alia, acids such as aqueous para-toluenesulfonic acid are described as the hardener and once more inter alia furane resins are described as the resin component, although again, if further specified, using a furane resin with at least 50% furfuryl alcohol.

A method is described in DE 102014106178 A1 in which a basic mold material is hardened in layers by means of an alkaline phenol resin, an ester, and optionally an inorganic additive.

In particular, the system of acid/furane resin corresponding to EP 1638758 B1 and the system of ester/alkaline phenol resin corresponding to DE 102014106178 A1 have been accepted somewhat in practice in the layer-by-layer construction of molded bodies and are used in the development of new cast parts and in the production of individual parts or small series when conventional production with molding tools would be too complicated and expensive, or respectively only describable with a complicated core package.

In particular, the acid/furane resin system has the disadvantage that shaped bodies produced according to this method must first be freed in an involved manner from an adhering and non-printed mixture consisting of the basic mold material and acid or resin component. Individuals who perform this task are exposed to dusts and solvent and binder vapors.

Object of the Invention

The object of the present invention is to provide a binder for the layer-by-layer construction of three-dimensional shaped bodies that permits the layer-by-layer production of three-dimensional shaped bodies that can be freed easily and with a sharp contour from a non-printed, adhering mixture consisting of the basic mold material and the acid or resin component. Beyond the significant time savings, the reduced exposure to solvent and binder vapors is an additional advantage in this case.

SUMMARY OF THE INVENTION

It was surprisingly found that a binder comprising at least:
(a) a resin component containing at least one furane resin obtainable by reacting at least one aldehyde compound, in particular formaldehyde, with furfuryl alcohol, and possibly with additional monomers, as well as more than 5% by weight, preferably more than 10% by weight, and particularly preferably more than 15% by weight, as well as less than 50% by weight, preferably less than 45% by weight and particularly preferably less than 40% by weight monomer furfuryl alcohol relative to the resin component, and
(b) an acid
significantly reduces the problem of adhesions by a non-printed mixture consisting of acid and the basic mold material, or the resin component and basic mold material, to the shaped bodies produced in this manner.

These and other objects are achieved by the subject of the independent claims; advantageous developments are the subject of the dependent claims or are described below.

The present invention therefore comprises a binder comprising an acid and a resin component comprising at least one furane resin, and containing monomer furfuryl alcohol of, on the one hand, more than 5% by weight, preferably more than 10% by weight, and particularly preferably more than 15% by weight furfuryl alcohol, and on the other hand less than 50% by weight, preferably less than 45% by weight, and particularly preferably less than 40% by weight monomer furfuryl alcohol relative in each case to the resin component.

The furane resin is characterized in that it is constructed from aldehyde compound(s), in particular formaldehyde, with furfuryl alcohol and possibly with additional monomers such as in particular urea, furfuryl alcohol derivatives (by definition, the furfuryl alcohol derivatives therefore do not comprise furfuryl alcohol itself) and/or phenol derivatives. In this case, the furane resin is constructed in particular of furfuryl alcohol and formaldehyde as monomers by more than 60% by weight, preferably more than 70% by weight, and particularly preferably more than 80% by weight overall relative to all of the monomers used.

With this binder, the so-called job box of the 3-D printer can be used spatially with greater efficiency, i.e., shaped bodies can be produced closer to each other in space since a "fusion" of the shaped bodies is prevented given the reduced tendency of sand to adhere. This also significantly increases the reusability of the loose, unprinted mixture consisting of the basic mold material and the acid or resin component. Given the reduced proportion of monomer furfuryl alcohol, furfuryl alcohol vapors in the interior of the so-called job box can be significantly reduced during the printing process, and impurities in the installation space and printhead can be minimized.

DETAILED DESCRIPTION OF THE INVENTION

It was surprisingly found that a three-dimensional shaped body produced with a resin component containing a furane resin and less than 50% by weight, preferably less than 45% by weight and especially preferably less than 40% by weight monomer furfuryl alcohol (relative to the resin component) and an acid manifests significantly less adhesion of the non-printed mixture consisting of the basic mold material and acid or resin component than a shaped body produced with a system consisting of a furane resin with at least 50% by weight monomer furfuryl alcohol when using a 3-D printing method with the layer-by-layer production of the three-dimensional shaped bodies.

The method according to the invention comprises the following steps according to a first preferred alternative:

- ia) production of a mixture consisting of refractory basic mold material and an acid, in particular at temperatures of 10 to 45° C., wherein relative to the mold material mixture, preferably more than 80% by weight, in particular more than 90% by weight, particularly preferably more than 95% by weight refractory basic mold material is used, and between 0.1% by weight to 3.1% by weight, preferably between 0.1% by weight and 2.6% by weight, and particularly preferably between 0.1% and 2.1% by weight acid is used relative to the refractory basic mold material, or between 0.1% by weight to 3% by weight, preferably between 0.1% by weight and 2.5% by weight, and particularly preferably between 0.1% by weight and 2% by weight is used relative to the mold material mixture;
- ib) layer-by-layer spreading of the (loose) mixture consisting of acid and refractory basic mold material with a layer thickness of 0.03 mm to 3 mm, preferably 0.03 to 1.5 mm, as the basic mold material layer;
- ic) printing of selected regions of the spread mixture, consisting of at least acid and basic mold material, with the resin component, wherein the amount of the resin component is between 0.1% by weight and 5% by weight, preferably between 0.3% by weight and 4% by weight, and particularly preferably between 0.5% by weight and 3% by weight relative to the mold material mixture, and the temperature of the printhead preferably lies between 20 and 80° C.; and
- id) multiple repetition of steps ib) and ic).

The method according to the invention comprises the following steps according to a second alternative:

- iia) production of a mixture consisting of refractory basic mold material and a resin component, in particular at temperatures of 10 to 45° C., wherein relative to the mold material mixture, preferably more than 80% by weight, in particular more than 90% by weight, particularly preferably more than 95% by weight refractory basic mold material is used, and between 0.1% by weight and 5.3% by weight, preferably between 0.3% by weight and 4.3% by weight, and particularly preferably between 0.5% by weight and 3.1% by weight resin component is used relative to the refractory basic mold material, or between 0.1% by weight and 5% by weight, preferably between 0.3% by weight and 4% by weight, and particularly preferably between 0.5% by weight and 3% by weight is used relative to the mold material mixture;
- iib) layer-by-layer spreading of the (loose) mixture consisting of the resin component and basic mold material with a layer thickness of 0.03 mm to 3 mm, preferably 0.03 to 1.5 mm, as the basic mold material layer;
- iic) printing of selected regions of the spread mixture, consisting of the resin component and basic mold material, with the acid, wherein the amount of the acid is between 0.1% by weight to 3% by weight, preferably between 0.1% by weight and 2.5% by weight, and particularly preferably between 0.1% by weight and 2% by weight relative to the mold material mixture, and the temperature of the printhead preferably lies between 20 to 80° C.; and
- iid) multiple repetition of steps iib) and iic).

The method according to the invention comprises the following steps according to a third alternative:

The method steps of the first and second alternatives as above, wherein however only the basic mold material and any additive are spread layer-by-layer (as the basic mold material layer), and the acid and resin component are added by two separate printheads, all at the respective concentrations as indicated above, wherein if applicable only one printhead spreads selectively, and the other extensively.

A "mold material mixture" is understood to be the overall composition containing all of the components directly before curing, but only to the extent that at least the resin component, acid and basic mold material are present in the corresponding volume portion so that the volume portion can cure.

Volume portions in the job box that do not contain the acid or the resin component are not attributed to the mold material mixture but are instead identified as a mixture consisting of a refractory basic mold material and resin component, or a mixture consisting of a refractory basic mold material and acid. This mixture can also always contain other components (without, however, either the acid or resin component). This mixture plus either an acid (in the first case), or plus a resin component (in the second case) and including all of the other components that subsequently in their totality produce the cured mold, or respectively the cured core directly before curing, is the mold material mixture.

The individual components will be described in the following.

(1) Refractory Basic Mold Material

Any particulate solids can be used as the refractory basic mold materials. The refractory basic mold material is in a free-flowing state. Conventional and familiar materials in a pure form as well as mixtures thereof can be used as the refractory basic mold material for producing casting molds. For example, quartz sand, zirconium sand or chrome ore sand, olivine, vermiculite, bauxite, fireclay and refractory basic mold materials that are artificially produced, or respectively are obtainable from synthetic materials (such as hollow microspheres) are suitable.

Materials that have a high melting point (melting temperature) are considered to be a refractory basic mold material. Preferably, the melting point of the refractory mold base material is greater than 600° C., preferably greater than 900° C., particularly preferably greater than 1200° C., and especially preferably greater than 1500° C.

The basic mold material preferably comprises more than 80% by weight, in particular more than 90% by weight, particularly preferably more than 95% by weight of the mold material mixture.

The average diameter of the refractory basic mold materials is generally between 30 μm and 500 μm, preferably between 40 μm and 400 μm, and particularly preferably between 50 μm and 250 μm. The particle size can be determined for example by sifting according to DIN ISO 3310.

(2) Binder

The binder is a multi-component system comprising at least the resin component and the acid as a catalyst for curing the resin component.

The components will be described in greater detail below.

(2a) Resin Component

The resin component comprises at least the following constituents:

i) more than 5% by weight, preferably more than 10% by weight, and particularly preferably more than 15% by weight, as well as less than 50% by weight, preferably less than 45% by weight and particularly preferably less than 40% by weight monomer furfuryl alcohol relative to the resin component determined by means of gas chromatography (see VDG memo P70 "Bindemittelprüfung, Prüfung von flüssigen säurehärtbaren Furanharzen," 3rd edition, April 1989);

ii) more than 15% by weight, preferably more than 20% by weight, and in particular more than 25% by weight, as well as less than 90% by weight, preferably less than 85% by weight and in particular less than 80% by weight is a furane resin, relative to the resin component.

The furane resin is a reaction product of an aldehyde compound, in particular formaldehyde, with furfuryl alcohol. In addition, other monomers can be reacted when reacting an aldehyde compound and furfuryl alcohol such as monomers containing nitrogen, for example urea, furfuryl alcohol derivatives and/or phenol compounds. The reaction is in the presence of an acid catalyst with preferably a $pK_a$ value at 25° C. greater than or equal to 2.5, preferably such with a $pK_a$ value of 2.7 to 6, and particularly preferably with a $pK_a$ value of 3 to 5. Preferably, reaction products of furfuryl alcohol and formaldehyde are used, wherein the molar ratio of furfuryl alcohol and formaldehyde is greater than or equal to 1; preferably it is between 1:0.2 to 1:0.9, preferably between 1:0.2 to 1:0.8, and particularly preferably between 1:0.3 to 1:0.7. In this case, the overall amount of furfuryl alcohol and formaldehyde used as a monomer is greater than 60% by weight, preferably greater than 70% by weight, and particularly preferably greater than 80% by weight relative to all of the monomers used. Weak acids, mixtures thereof, as well as their salts with preferably a $pK_a$ value at 25° C. greater than or equal to 2.5, preferably such with a $pK_a$ value of 2.7 to 6, and particularly preferably with a $pK_a$ value of 3 to 5 are used as acid catalysts for reacting furfuryl alcohol and formaldehyde. This includes preferably organic acids such as benzoic acid, lactic acid, adipic acid, citric acid or salicylic acid. Zinc acetate is mentioned as an example of a metal salt.

The type and production of the above-described reaction products are for example the subject of DE 202011110617 U1 and DE 102014002679 A1.

iii) Moreover, an additional 0 to 25% by weight, preferably 1 to 20% by weight, and in particular 3 to 15% by weight, relative to the resin component, of polymers obtained from the reaction of aldehyde compounds, in particular formaldehyde, with monomers containing nitrogen and possibly furfuryl alcohol or furfuryl alcohol derivatives can be added as further constituent to the resin component. In particular, these are the reaction products of aldehyde compounds, in particular formaldehyde, and compounds containing nitrogen, preferably urea, wherein the molar ratio of urea and formaldehyde is less than or equal to 1; preferably it is between 1:1 to 1:5, preferably between 1:1 to 1:4, and particularly preferably between 1:1.2 to 1:3.

Strong acids, mixtures thereof, as well as their salts with preferably a $pK_a$ value at 25° C. less than or equal to 2.5, preferably such with a $pK_a$ value of 2.5 to 3, and particularly preferably with a $pK_a$ value of 2 to 0 are used as acid catalysts for reacting urea and formaldehyde. This preferably includes para-toluenesulfonic acid or salts of phosphoric acid such as sodium phosphate. The use of constituents of the resin component described under iii) has a positive effect on the development of the strength of the shaped body produced by layer-by-layer construction and, in a preferred embodiment, these are a constituent of the resin component within the indicated limits.

iv) Optionally, an additional 0% by weight to 25% by weight, preferably 0% by weight to 20% by weight and in particular 0% by weight to 15% by weight, relative to the resin component, of reaction products of the aldehyde compound, in particular formaldehyde, and phenol compounds, in particular phenol itself, can be added as polymers in the form of basically catalyzed resol resins to the resin component.

v) Optionally, plastifiers or curing moderators in amounts of 0% by weight to 25% by weight, preferably 0% by weight to 20% by weight and in particular 0.2% by weight to 15% by weight, relative to the resin component, can be added to the resin component;

vi) Optionally, surface modifiers in amounts of 0 to 5% by weight, preferably between 0.01% to 2% by weight and particularly preferably between 0.05% to 1% by weight, relative to the resin component, can be added to the resin component.

In addition to furfuryl alcohol itself, furfuryl alcohol derivatives such as 2,5-bis(hydroxymethyl)furane, methyl or ethyl ether of 2,5-bis(hydroxymethyl)furane or 5-hydroxymethylfurfural can be used.

Generally, aldehydes of formula R—CHO are used as the aldehydes, wherein R is a hydrogen atom or a carbon atom residue with preferably 1 to 8, particularly preferably 1 to 3 carbon atoms.

Examples are formaldehyde, for example in the form of aqueous solutions, or polymers in the form of trioxane or para-formaldehyde, acetaldehyde, propionaldehyde, furfurylaldehyde (furfural), butyraldehyde, glyoxal and mixtures thereof. Formaldehyde or mixtures containing primarily formaldehyde (relative to the molar amount of the aldehydes) are particularly preferable.

Suitable compounds containing nitrogen are for example urea derivatives such as urea itself, melamine or ethylene urea, or amines such as ammonia and triethylamine, amino alcohols such as monoethanolamine or 2-amino-2-methyl-1-propanol. Urea, triethyl amine or monoethanolamine, in particular urea, are used in a particularly preferred embodiment.

These compounds containing nitrogen can be made to react directly with the furfuryl alcohol or the furfuryl alcohol derivative and the aldehyde compound or with their pre-condensate, or in a preferred variation, added as an independent pre-condensate, in particular in the form of urea derivatives such as preferably urea itself, condensed with an aldehyde, preferably formaldehyde, and optionally condensed with preferably furfuryl alcohol or a furfuryl alcohol derivative.

The amount of nitrogen-containing compounds is selected so that the overall nitrogen content (N) of the resin component determined according to Kjeldahl (according to DIN 16916-02-B2 or VDG memorandum P70), is less than 5% by weight, preferably less than 3.5% by weight and particularly preferably less than 2% by weight so that surface flaws in the cast part resulting from the presence of nitrogen are reduced or avoided.

Suitable phenol compounds are characterized by one or more aromatic rings and at least one hydroxy substitution on these rings. In addition to phenol itself, examples are substituted phenols such as cresols or nonylphenol, 1,2-dihydroxybenzene (catechol), 1,3-dihydroxybenzene (resorcinol), cashew nut shell oil, i.e., a mixture consisting of cardanol and cardol, or 1,4-dihydroxybenzene (hydroquinone) or phenolic compounds such as bisphenol A or mixtures thereof. Phenol as a phenolic component is particularly preferable.

These phenols can be made to react directly with the furfuryl alcohol and the aldehyde compound or with their pre-condensate. Moreover, reaction products of phenols and formaldehyde in the form of resol resins that are produced under alkaline conditions can be added to the resin component.

The overall content of free phenol in the resin component is preferably less than 1% by weight (determined by gas chromatography).

To additionally dilute the above-described resin component to a viscosity range needed for the printing process of 2 mPas to 70 mPas, preferably from 5 mPas to 60 mPas and particularly preferably from 5 mPas to 50 mPas (Brookfield, at 25° C.), the resin component can contain additional solvents such as water or organic solvents that are not furfuryl alcohol comprising 1 to 25 carbon atoms such as alcohols like ethanol, propanol, 5-hydroxy-1,3-dioxane, 4-hydroxymethyl-1,3-dioxolane or tetrahydrofurfuryl alcohol, oxetanes such as trimethylolpropane oxetane, ketones such as acetone or esters such as triacetine and propylene carbonate. Water and ethanol as well as mixtures thereof are particularly preferred.

The amount of the solvent(s) added to the resin component is chosen so that the overall water content of the resin component (determined by Karl-Fischer titration according to DIN 51777) is between 5% by weight and less than 40% by weight, preferably 5% by weight and less than 35% by weight, and in particular 7% by weight and less than 30% by weight, and the amount of additional solvents that are not furfuryl alcohol or water is between 0% by weight to 30% by weight, preferably 0.5% by weight to 25% by weight, and in particular 1% by weight to 20% by weight, relative to the resin component in each case.

Moreover, the resin component can contain additional additives such as curing moderators or plastifiers. This includes for example diols or polyols with 2 to 12 carbon atoms, fatty acids, silicones or phthalates that are used in amounts of 0% by weight to 25% by weight, preferably 0% by weight to 20% by weight and particularly preferably in amounts of 0.2 to 15% by weight relative to the resin component. Glycols such as ethylene glycol as well as fatty acids such as oleic acid are particularly preferable.

In addition to the components already mentioned, the resin component can contain suitable additives such as surface modifiers which include for example silanes (for example according to EP 1137500 B1). Suitable silanes are for example amino silanes, epoxy silanes, mercapto silanes, hydroxy silanes and ureido silanes such as gamma-hydroxypropyl trimethoxysilane, gamma-aminopropyl trimethoxysilane, 3-ureidopropyl triethoxysilane, gamma-mercaptopropyl trimethoxysilane, gamma-glycidoxypropyl trimethoxysilane, beta-(3,4-epoxy-cyclohexyl)-trimethoxysilane and N-beta-(aminoethyl)-gamma-aminopropyl trimethoxysilane or other polysiloxanes. The added amounts of silanes are in particular between 0% by weight to 5% by weight, preferably between 0.01% by weight to 2% by weight, and particularly preferably between 0.05% by weight to 1% by weight, relative to the resin component in each case.

As a print medium, the resin component, as described above, has a viscosity (Brookfield, 25° C., spindle 21, DIN EN ISO 2555) of 2 mPas to 70 mPas, preferably 5 mPas to 60 mPas, and particularly preferably from 5 mPas to 50 mPas at 25° C. in each case. Also independent thereof, the surface tension is from 10 mN/m to 70 mN/m, preferably of 15 mN/m to 60 mN/m, particularly preferably from 15 mN/m to 55 mN/m and especially preferably from 20 mN/m to 50 mN/m, determined using the Wilhelmy plate method with a Krüss K100 force tensiometer measured at 20° C. To lower the surface tension, the resin component can be additionally modified with surface-active substances such as cationic, anionic or non-ionic surfactants, such as with carboxylates, sulfonates or sulfates like sodium-2-ethylhexyl sulfate as the anionic surfactant, quaternary ammonium compounds like esterquats as the cationic surfactants, or alcohols, ethers or ethoxylates likepolyalkylene glycol ether as the nonionic surfactants.

It is mentioned in this context that the printing temperature, i.e., the temperature of the printhead, is not restricted to room temperature but can instead lie between 20° C. to 80° C., in particular 20 to 40° C., and even higher viscosity binders can thereby be easily printed.

Independent thereof, the temperature of the resin component is between 15° C. and 80° C., in particular 20 to 40° C. while printing.

The amount of the resin component in the mold material mixture is between 0.1% by weight and 5% by weight, preferably between 0.3% by weight and 4% by weight, and particularly preferably between 0.5% by weight and 3% by weight relative to the mold material mixture.

(2b) Acid

Conventional acids for foundry mold production or mixtures thereof can be used as catalysts for curing the resin component that have a $pK_a$ value at 25° C. of less than 4, preferably with a $pK_a$ value less than or equal to 3.9, preferably with a $pK_a$ value less than 3, and particularly preferably with a $pK_a$ value less than 1.5 such as organic acids like para-toluene sulfonic acid, xylene sulfonic acid, benzene sulfonic acid, methane sulfonic acid or lactic acid, as well as inorganic acids like sulfuric acid or phosphoric acid, or mixtures of various organic and inorganic acids.

Aqueous para-toluene sulfonic acid, sulfuric acid and/or aqueous lactic acids as well as mixtures thereof are particularly preferred as the acids.

The amount of the acid in the mold material mixture is between 0.1% by weight to 3% by weight, preferably between 0.1% by weight and 2.5% by weight, and particularly preferably between 0.1% by weight and 2% by weight, relative to the mold material mixture.

Moreover, the acid can have other additives to optimize the technical sand properties. This includes for example curing moderators such as glycols, especially ethylene glycol or alcohols like ethanol that are used in amounts of 0% by weight to 15% by weight, preferably 0% by weight to 10% by weight and in particular 0% to 7% by weight relative to the acid.

(3) Basic Mold Material Additive

Optionally, organic or mineral additives can be added to the mold material mixture such as iron oxides, silicates, aluminates, hollow microspheres, sawdusts or starches as well as mixtures thereof to avoid casting flaws at an amount of less than 10% by weight, preferably at amounts of less than 7% by weight, and particularly preferably at amounts of less than 5% by weight (relative in each case to the mold material mixture).

The invention will be explained below with reference to test examples without being restricted to them.

EXAMPLES

Production of a Furane Resin—Resin 1

Furfuryl alcohol (79% by weight), paraformaldehyde 92% (12.1% by weight), adipic acid (4.8% by weight), lactic acid 80% (0.7% by weight), urea (1.7% by weight), water (1.7% by weight)

2,370 g furfuryl alcohol, 363 g paraformaldehyde and 144 g adipic acid are added while stirring. Then 21 g lactic acid 80% is added, and the reaction batch is heated to 110° C. After about 240 minutes, the batch is cooled to 100° C. and stirred at this temperature for another 120 minutes. Then the reaction batch is cooled to 80° C., and 51 g urea and 51 g water are added.

Amount of reaction product consisting of Furfuryl alcohol, formaldehyde and urea*: 67% by weight
Amount of monomer furfuryl alcohol: 22% by weight
Amount of water: 11% by weight
Amount of free formaldehyde: 0.3% by weight
Amount of nitrogen: 0.8% by weight

*Constituent according to the description of the resin component according to section ii)

Reaction Product of Formaldehyde and Urea—Resin 2

A commercially available product by the company Hexion was used as the reaction product of formaldehyde and urea.

Borden™ CPU 16147 by Hexion
Amount of reaction product of formaldehyde and urea**: 65% by weight
Amount of water: 30% by weight
Amount of free formaldehyde: 0.3% by weight
Amount of nitrogen: 23% by weight The compositions of the resin components investigated in the following with respect to the tendency of sand to adhere are described in Table 1:

**Constituent according to the description of the resin component according to section ii)

TABLE 1

| Example | Resin 1 [% by weight] | Resin 2 [% by weight] | Additional furfuryl alcohol [% by weight] | Additional water [% by weight] | Ethylene glycol (% by weight) | Ethanol [% by weight] | (3-aminopropyl) triethoxysilane [% by weight] |
|---|---|---|---|---|---|---|---|
| 1 | — | 44 | 51 | — | 4.8 | — | 0.2 |
| 2 | — | 46 | 49 | — | 4.8 | — | 0.2 |
| 3 | — | 47 | 48 | — | 4.8 | — | 0.2 |
| 4 | — | 50 | 45 | — | 4.8 | — | 0.2 |
| 5 | — | 8.8 | 78 | 8 | 5 | — | 0.2 |
| 6 | — | 5.5 | 92 | 1.8 | 0.5 | — | 0.2 |
| 7 | 15 | 38 | 42 | — | 4.8 | — | 0.2 |
| 8 | 64.8 | — | 35 | — | — | — | 0.2 |
| 9 | 70.8 | — | 29 | — | — | — | 0.2 |
| 10 | 45 | 6.5 | 19.5 | 15.5 | 1.8 | 11.5 | 0.2 |
| 11 | 47 | 5.5 | 21.5 | 11.5 | 6.8 | 7.5 | 0.2 |

Investigation of the Reduction of Adhesions

To investigate the reduction of adhesions of a mixture consisting of an acid and basic mold material to the cured mold material mixture containing all of the binder components, 3 kg quartz sand H32 as the basic mold material and 0.4% by weight, relative to the basic mold material, 65% para-toluene sulfonic acid as the acid, was mixed intensively for 1 minute at 75 RPM under laboratory conditions in the bowl of a paddle-vane-type mixer from the company Beba (room temperature=sand temperature=20° C., humidity=30%). This mixture was then compressed in a wood mold with the dimensions of 400 mm×230 mm×22.5 mm, and then 0.5 g resin component was drizzled on at points. To check reproducibility, this procedure was done at a total of eight points on the surface of the mixture consisting of acid and basic mold material. The wood mold prepared in this manner was stored for 24 hours at room temperature, and the binder was cured. Then the formed cores consisting of the basic mold material/acid/resin component was removed from the loose mixture consisting of acid and basic mold material and evaluated gravimetrically.

This experiment was able to demonstrate that sand adhesions can be significantly reduced by using a binder according to the invention (Table 2). This is a significant advantage in comparison to binder systems that are described in the prior art.

The evaluation was based on grades of 1 (very few sand adhesions) to 6 (very many sand adhesions).

TABLE 2

| Example | Overall amount of monomer furfuryl alcohol in % by weight relative to the resin component[a] | Amount of reaction product from furfuryl alcohol and formaldehyde in the presence of urea in % by weight relative to the resin component[b] | Amount of reaction product from formaldehyde and urea in % by weight relative to the resin component[c] | Overall amount of water in % by weight[d] | Amount of other solvents that are not furfuryl alcohol or water in % by weight | Amount of nitrogen in % by weight relative to the resin component, determined according to Kjeldahl | According to the invention | Evaluation of sand adhesions |
|---|---|---|---|---|---|---|---|---|
| 1 | 51 | 0 | 29 | 15 | 5 | 10.1 | No | 6 |
| 2 | 49 | 0 | 30 | 16 | 5 | 10.6 | No | 6 |
| 3 | 48 | 0 | 31 | 16 | 5 | 10.8 | No | 6 |
| 4 | 45 | 0 | 33 | 17 | 5 | 11.5 | No | 6 |
| 5 | 78 | 0 | 5.7 | 10.6 | 5 | 2.0 | No | 5 |
| 6 | 92 | 0 | 3.6 | 3.5 | 0.5 | 1.3 | No | 5 |
| 7 | 45 | 10 | 25 | 15 | 5 | 8.7 | No | 5 |
| 8 | 49 | 44 | 0 | 7 | 0 | 0.5 | Yes | 1 |
| 9 | 45 | 47 | 0 | 8 | 0 | 0.6 | Yes | 1 |
| 10 | 29 | 30 | 4 | 23 | 14 | 1.9 | Yes | 2 |
| 11 | 32 | 31 | 4 | 19 | 14 | 1.5 | Yes | 2 |

[a] the amount of monomer furfuryl alcohol is composed from the amount of the unreacted furfuryl alcohol that did not react during the production of the furane resin (resin 1) and the amount of separately added furfuryl alcohol
[b] the amount corresponds to the amount of the reaction product from furfuryl alcohol, formaldehyde and urea of resin 1 (see above)
[c] the amount corresponds to the amount of the reaction product from formaldehyde and urea of resin 2 (see above)
[d] the amount of water is composed from the amounts of water from resin 1 and resin 2 and the amount of separately added water.

The invention claimed is:

1. A method for the layerwise construction of cured three-dimensional shaped bodies, wherein a refractory basic mold material is discharged layer-by-layer to produce a basic mold material layer, and at least one component of the binder is selectively applied layerwise by a printhead to the basic mold material layer separate from the refractory basic mold material, and
the binder comprises at least two components:
   a) a resin component comprising a furane resin as a reaction product from at least an aldehyde compound and furfuryl alcohol, wherein the resin component comprises more than 5% by weight and less than 50% by weight monomer furfuryl alcohol, relative to the resin component, and
   b) an acid as a catalyst component, and
the sequence of discharging at least one basic mold material layer and applying at least one component of the binder layer is repeated step-by-step.

2. The method according to claim 1, wherein either
(A) the refractory basic mold material is discharged layerwise with the acid being added so that at least refractory basic mold material and acid form the basic mold material layer, and the resin component is applied layerwise by the printhead to the basic mold material layer, or
(B) the refractory basic mold material is discharged layerwise with the resin component being added so that at least refractory basic mold material and resin component form the basic mold material layer, and the acid is applied layerwise by the printhead to the basic mold material layer.

3. The method according to claim 1, wherein the resin component contains more than 5% by weight, as well as less than 50% by weight of the monomer furfuryl alcohol.

4. The method according to claim 1, wherein the resin component contains more than 15% by weight, as well as less than 90% by weight of the furane resin.

5. The method according to claim 1, wherein the furane resin is a reaction product from furfuryl alcohol and formaldehyde.

6. The method according to claim 5, wherein the furane resin is a reaction product from furfuryl alcohol and formaldehyde, as well as compounds containing nitrogen, such as preferably urea, preferably with a molar ratio of furfuryl alcohol to formaldehyde greater than or equal to 1.

7. The method according to claim 1, wherein the acid catalyst for the production of the reaction product from formaldehyde and furfuryl alcohol is an acid with a pKa value of 2.7 to 6.

8. The method according to claim 1, wherein the resin component contains 0 to 25% by weight of reaction products of formaldehyde and urea.

9. The method according to claim 1, wherein the overall amount of water in the resin component is at most 40% by weight.

10. The method according to claim 1, wherein the resin component additionally comprises an organic solvent that is not furfuryl alcohol with 1 to 25 carbon atoms, wherein the amount of organic solvent does not exceed an amount of 30% by weight.

11. The method according to claim 1, wherein the resin component has a viscosity (DIN EN ISO 2555, Brookfield, 25° C.) of 2 mPas to 70 mPas.

12. The method according to claim 1, wherein the resin component at 200C has a surface tension from 10 mN/m to 70 mN/m, determined by the Wilhelmy plate method with a Krüss K100 force tensiometer at 20° C.

13. The method according to claim 1, wherein the amount of the resin component is between 0.1% by weight and 5.3% by weight, relative to the refractory basic mold material, or respectively between 0.1% by weight and 5% by weight, relative to the mold material mixture.

14. The method according to claim 1, wherein the acid used for curing the resin component has a pKa value at 25° C. of less than 4.

15. The method according to claim 1, wherein the acid component of the binder is para-toluenesulfonic acid, sulfuric acid, or lactic acid, or a mixture thereof.

16. The method according to claim 1, wherein the amount of the acid is between 0.1% by weight to 3.1% by weight, relative to the refractory basic mold material, or respectively between 0.1% by weight to 3% by weight, relative to the mold material mixture.

17. The method according to claim 1, wherein the refractory basic mold material comprises one or more constituents of the group consisting of quartz sand, zirconium sand, chrome ore sand, olivine, vermiculite, bauxite, fireclay, glass pearls, glass granules, aluminum silicate microspheres and mixtures thereof.

18. The method according to claim 1, wherein the refractory basic mold material has an average particle diameter of 30 µm to 500 µm.

19. The method according to claim 1, wherein the refractory basic mold material is used at more than 80% by weight, relative to the mold material mixture.

20. The method according to claim 1, wherein the acid is added to the refractory basic mold material discharged layerwise, wherein the mixture is produced from acid and basic mold material, and the layer thickness of the mixture consisting of acid and basic mold material is 0.03 mm to 3 mm, before selected regions of the mixture consisting of acid and basic mold material are selectively printed with the resin component.

21. The method according to claim 1, wherein the temperature of the printhead is between 20° C. to 80° C.

22. The method according to claim 1, further comprising the following steps: i) after termination of layerwise construction, curing the body in an oven or by microwaving, and then ii) removing the unprinted mixture consisting of the acid or resin component and basic molding material from the at least partially cured casting mold.

23. The method according to claim 1, wherein the printhead has a plurality of nozzles, and the nozzles are selectively controllable individually, wherein the printhead is a drop-on-demand printhead with a bubble jet or piezo system.

24. The method according to claim 1, wherein the printhead is movably controlled by a computer, at least in one plane, and the nozzles apply at least one component layerwise, and/or the printhead is heatable.

25. A mold or core produced according to the method of claim 1 for metal casting.

26. The method of claim 1, wherein the resin component comprising a furane resin is a reaction product from at least an aldehyde compound and furfuryl alcohol, and compounds containing nitrogen and/or phenol compounds, wherein the nitrogen content of the resin component is less than 5% by weight, and wherein the resin component comprises more than 5% by weight and less than 50% by weight monomer furfuryl alcohol, relative to the resin component.

27. The method according to claim 26, wherein: the compounds containing nitrogen include urea, and/or the amount of the compounds containing nitrogen is chosen such that the overall amount of nitrogen in the resin component is less than 5% by weight.

* * * * *

UNITED STATES PATENT AND TRADEMARK OFFICE
CERTIFICATE OF CORRECTION

PATENT NO.       : 11,253,912 B2
APPLICATION NO.  : 16/618978
DATED            : February 22, 2022
INVENTOR(S)      : Natascha Hurkes et al.

It is certified that error appears in the above-identified patent and that said Letters Patent is hereby corrected as shown below:

In the Claims

Column 12, Claim 12, Line 57, please delete "200C" and insert -- 20°C --.

Signed and Sealed this
Thirtieth Day of August, 2022

Katherine Kelly Vidal
*Director of the United States Patent and Trademark Office*